United States Patent [19]

Kroha

[11] Patent Number: 4,906,029
[45] Date of Patent: Mar. 6, 1990

[54] FUEL FILTER NIPPLE

[75] Inventor: John L. Kroha, Ferndale, Mich.

[73] Assignee: Flexon, Inc., Ferndale, Mich.

[21] Appl. No.: 290,636

[22] Filed: Dec. 27, 1988

[51] Int. Cl.$^4$ .............................................. F16L 3/04
[52] U.S. Cl. ................................... 285/158; 285/177; 285/286
[58] Field of Search ............... 285/158, 189, 177, 233, 285/424, 222, 286

[56] References Cited

U.S. PATENT DOCUMENTS 2,025,271  12/1935  Compo ................................. 285/189
4,689,868   9/1987  Hughes et al. .................. 285/177 X
4,733,890   3/1988  Vyse ................................ 285/158 X
4,807,913   2/1989  Bartholomew .................... 285/233

Primary Examiner—Dave W. Arola
Attorney, Agent, or Firm—Basile and Hanlon

[57] ABSTRACT

A fuel filter nipple with a sleeve portion that fits directly into a fuel filter housing. One flange abuts and is brazed onto the housing. The nipple is formed of a tubular member with longitudinally spaced openings, one of which is larger than the other. One end of the sleeve portion defines the first opening, while the other end of it forms the flange which abuts the housing. The tubular member has a body portion extending from the flange to the other opening, as well as another flange located somewhere along the body portion.

10 Claims, 1 Drawing Sheet

FUEL FILTER NIPPLE

BACKGROUND OF THE INVENTION

1. Field of the Invention

The present invention generally relates to fuel filter nipples, and more particularly, is concerned with a one piece nipple which can be directly brazed to a fuel filter housing.

2. Description of the Relevant Art

Fuel filters require some type of connection between the fuel filter housing and the fuel hose. This connection must be leak-proof and sturdy, yet easy to assemble onto the housing. Also, it must be simple to put the hose onto the connection, but the hose must then remain fixed.

For this purpose, fuel filter nipples are generally used. A depiction of a typical fuel filter nipple 100 is set forth in FIG. 3. The nipple is brazed onto a separate washer 110 which is, in turn, brazed onto the fuel filter housing 120.

This type of nipple assembly has several inherent and practical problems. Due to its design, it cannot fit directly onto a filter housing, but needs a separate washer. The use of the washer itself causes many problems. It necessitates the use of extra time and money to braze the washer separately. Also, the metal of the washer must be the same metal or alloy as the housing and the nipple. Otherwise, if three different metals are used, they will have different coefficients of expansion, thus causing leakage between the housing and the washer, and between the washer and the nipple.

The housing with the nipple attached is vulnerable to breakage during handling, assembly and use. If the brazed attachment between housing and nipple is not strong enough, the sheer angle at which the nipple must be attached makes breakage likely if an object knocks against it.

A practical disadvantage of this typical fuel nipple is that it is often mistakenly brazed to the washer backwards. Although one end of the nipple is tapered, the difference in appearance is so slight that, during assembly, workers have confused the ends and brazed the wrong one. This necessitates rejection of the assembly since the flange, which holds the hose in place on the body of the nipple, is off center.

Therefore, it would be desirable to have a nipple which would eliminate the need for a washer, would be more resistant to breakage, would lessen leakage problems, and which would be impossible to inadvertently assemble to the housing incorrectly.

SUMMARY OF THE INVENTION

The present invention provides a fuel filter nipple which overcomes the problems described above. The nipple has a sleeve portion which fits directly into the housing of the fuel filter, with a flange abutting and brazed onto the outside of the housing. Therefore, only one braze is needed, and there is less opportunity for leakage. The nipple will be highly resistant to breakage since the sleeve fits inside the housing, and this additionally will prevent the nipple from falling off prior to brazing. Furthermore, workers will not mistake one end for the other during assembly, since the two ends have a distinctly different appearance.

Specifically, the fuel filter nipple is made of a tubular member with longitudinally spaced openings, one of which is larger than the other. One end of a sleeve portion defines the first opening, while the other end of the sleeve forms the flange which abuts the housing. The tubular member has a body portion extending from the flange to the other opening. Also, the tubular member has another flange located somewhere on the body portion.

BRIEF DESCRIPTION OF THE DRAWINGS

Various other features and advantages will become more readily apparent when considered in view of the following specification and drawings, in which.

DETAILED DESCRIPTION OF THE INVENTION

Figure 1:
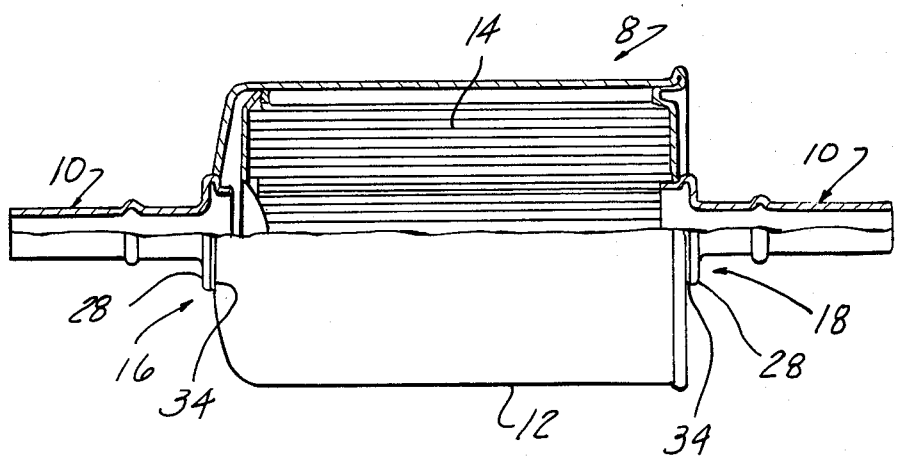
FIG. 1 is a perspective view of two fuel filter nipples in cut-away cross-section according to the present invention, shown here with one nipple attached to the inlet and one nipple attached to the outlet of a fuel filter housing.

Referring now to the drawings, and more particularly, to FIG. 1, there is shown a cut-away cross-section of the fuel filter housing and nipple assembly generally designated 8. The nipple 10 of the present invention is shown attached to a fuel filter housing 12. The flow through the fuel filter 14 as shown is from left to right. A nipple 10 is therefore shown connected to the inlet 16 and the outlet 18 of the filter housing 12. It is to be understood that the nipple 10 can serve equally well at both inlet 16 and outlet 18, but since the nipple 10 is identical in both places, reference hereafter will be made to the nipple 10 as it appears at the outlet 18.

Figure 2:
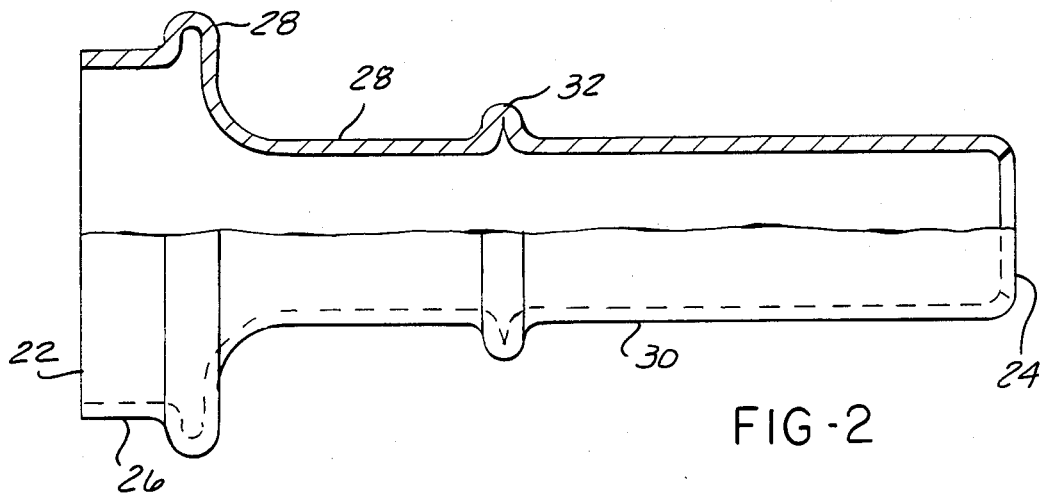
FIG. 2 is a cut-away cross-section of the fuel filter nipple according to the present invention.
Figure 3:
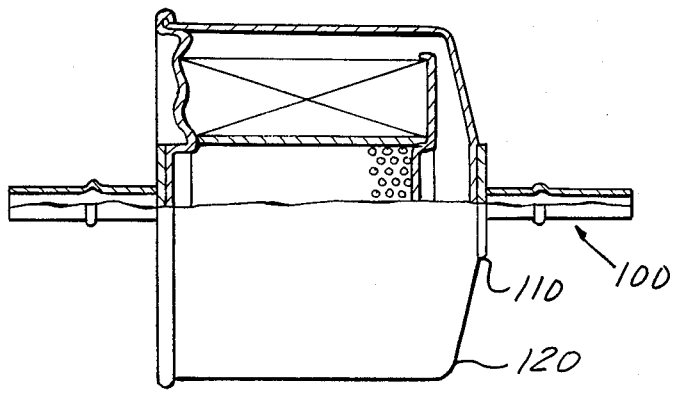
FIG. 3 is a perspective view of a typical fuel filter nipple attached to a fuel filter housing as used in the relevant art.

Referring now to FIG. 2, the nipple 10 is made of a tubular member 20 which has longitudinally spaced openings. The first opening 22 is larger than the second opening 24. One end of a sleeve portion 26 defines the first opening 22, while the other end of the sleeve portion 26 forms the first flange 28. The nipple 10 also has a body portion 30 which extends from the first flange 28 to the second opening 24. The body portion 30 contains a second flange 32.

The second flange 32, which holds a fuel hose in place on the nipple 10, may be located anywhere along the body portion 30.

In the preferred embodiment, second flange 32 is located between the first flange 28 and the midpoint of the body portion 30. Additionally, the region on the tubular member 20 between the first flange 28 and the body portion 30 is a smooth, inward curve. Also preferred is a tubular member 20 which is circular.

A fuel filter nipple 10 of the present invention is made for use with a fuel filter housing 12. Sleeve portion 26 is matingly receivable with housing 12. As shown in Fig. 1, sleeve portion 26 is thus coupled with housing 12, and first flange 28 abuts the outside of housing 12. In the preferred embodiment, nipple 10 is metal, preferably some type of stainless steel. However, as is evident to one skilled in the art, other materials may be used. One braze 34 connects the sleeve portion end of first flange 28 to the housing 12.

It is thought that the fuel filter nipple of the present invention and many of its attendant advantages will be understood from the foregoing description, and it will be apparent that various changes may be made in the form and construction of the parts thereof without departing from the spirit and scope of the invention, the form described above being exemplary rather than limiting.

Having thus described the invention, what is claimed is:

1. A fuel filter nipple, comprising:
    a tubular member having opposite ends and being open at its opposite ends and having an enlarged diameter sleeve portion at one and a smaller diameter body portion extending from the sleeve portion to the other end of the tubular member, the sleeve portion being at least externally tapered;
    first annular flange means on the sleeve portion; and said taper extending from at least adjacent said first annular flange means to said one end with the external diameter at said one end being less than the external diameter adjacent said first annular flange and
    second annular flange means on the body portion.

2. A fuel filter nipple, comprising:
    a tubular member having opposite ends and being open at its opposite ends and having an enlarged diameter sleeve portion at one end and a smaller diameter body portion having a midpoint, the body portion extending from the sleeve portion to the other end of the tubular member, the sleeve portion being at least externally tapered;
    a first annular flange on the sleeve portion; said taper extending from at least adjacent said first annular flange means to said one end with the external diameter at said one end being less than the external diameter adjacent said first flange;
    a second annular flange between the first flange and the midpoint; and
    a region on the tubular member which is curved inwardly from the first flange to the body portion.

3. A fuel filter nipple for use with a fuel filter housing, the fuel filter nipple comprising:
    a tubular member having opposite ends and being open at its opposite ends and having an enlarged diameter sleeve portion at one end, the sleeve portion matingly receivable within a larger diameter opening in the housing, the tubular member having a body portion extending from the sleeve portion to the other end of the tubular member;
    first annular flange means on the sleeve portion; and
    sole annular flange means on the body portion.

4. The invention of claim 3 wherein the body portion has a midpoint and the sole flange means is between the first flange means and the midpoint.

5. The invention of claim 3 wherein the sleeve portion of the tubular member is at least externally tapered.

6. The invention of claim 3 wherein the tubular member has a region which is curved inwardly from the first flange means to the body portion.

7. The invention of claim 3 wherein the first flange means abuts the housing.

8. The invention of claim 7 wherein the tubular member is metal.

9. The invention of claim 8 wherein the flange means is brazed directly to the housing.

10. A fuel filter nipple for use with a housing for a fuel filter, the fuel filter nipple comprising:
    a metal tubular member having opposite ends and being open at its opposite ends and having an enlarged diameter sleeve portion at one end, the sleeve portion matingly receivable with the housing, the tubular member having a smaller diameter body portion having a midpoint, the body portion extending from the sleeve portion to the other end of the tubular member, the sleeve portion being at least externally tapered;
    a first annular flange on the sleeve portion, the first flange being brazed to the housing; said taper extending from at least adjacent said first annular flange means to said one end with the external diameter at said one end being less than the external diameter adjacent said first annular flange;
    a second annular flange located between the first flange and the midpoint; and
    a region on the tubular member which is curved inwardly from the first flange to the body portion.

* * * * *